United States Patent [19]

Fegley

[11] 4,068,780

[45] Jan. 17, 1978

[54] ELECTROTHERMALLY ACTUATED FLUID DISPENSING DEVICE

[76] Inventor: Charles R. Fegley, 1606 Frush Valley Road, Laureldale, Pa. 19605

[21] Appl. No.: 692,455

[22] Filed: June 3, 1976

[51] Int. Cl.² ............................................. F17C 13/08
[52] U.S. Cl. ........................................ 222/5; 109/20; 109/33; 222/61; 222/70; 222/402.14
[58] Field of Search .............. 222/70, 61, 449, 402.20, 222/3, 5, 402.14, 180, 325; 169/26, 57, 60, 61, 42; 9/316–320; 109/20, 33, 29; 292/DIG. 66

[56] References Cited

U.S. PATENT DOCUMENTS

| 2,928,573 | 3/1960 | Edelstein | 222/70 |
| 3,929,259 | 12/1975 | Fegley et al. | 222/325 X |
| 3,974,941 | 8/1976 | Mettler | 222/70 |

Primary Examiner—Robert B. Reeves
Assistant Examiner—John P. Shannon

[57] ABSTRACT

A fluid dispensing device for use as anti-burglar device is disclosed which discharges a fluid, containing a chemical such as tear gas, into an area to be protected when an intruder causes the device to be actuated. The anti-burglar device employs an electrothermal actuator strip for causing fluid discharge when an electric current flows through it. In addition, the fluid dispensing device may also be used as a metered spray atomizing device by the addition of a timing device for periodically actuating the valve of the pressurized container for emitting sprays of atomized fluid into the atmosphere for the spray application of insecticides, disinfectants, deodorants, room air fresheners and the like.

23 Claims, 12 Drawing Figures

ELECTROTHERMALLY ACTUATED FLUID DISPENSING DEVICE

BACKGROUND OF THE INVENTION

The invention relates generally to a fluid dispensing device for use as an anti-burglar device of the chemical weapon type and more particularly to an anti-burglar device which discharges a fluid, containing a chemical such as tear gas, from a pressurized container into the protected area upon actuation by an unauthorized person. Once actuated, the protected area is flooded with the chemical, thereby forcing evacuation of the protected area by the intruder.

Chemical weapons have been known in the art for many years. One type of chemical weapon is the conventional tear gas grenade which is manually triggered and manually hurled at a target area, causing the target area to be flooded with the chemical irritant.

In another type of chemical weapon, the chemical irritant is stored under pressure in an aerosol type container. The actuating member is again manually triggered and the chemical irritant in the form of a spray is manually directed at the target.

A third type of chemical anti-burglar device discharges an explosive tear gas shell into the area but this type is both dangerous and very limited as to the amount of tear gas which is discharged into the area to be protected.

A fourth type of anti-burglar device is of the booby trap type in which a pressurized container releases its chemical contents into an area to be protected. This type of device is presently actuated mechanically by physical force or electrically by an electromechanical actuator controlling a trigger. The electrically operated anti-burglar device requires the use of a trigger and an electromechanical actuator to control the trigger. This device is complex and requires relatively large amounts of electric power for release.

The fluid dispensing device is also useful for periodically emitting a spray of atomized fluid into the atmosphere through the addition of a timing circuit. The fluid dispensing device may then be used for the spray application of insecticides, disinfectants, deodorants, room air fresheners and the like. In the past, such devices for periodically emitting a spray of atomized fluid employed electromechanical devices such as motors with gear trains, heavy solenoids or the like which are more complex in structure and more costly to produce.

Thus, what is needed is an a fluid dispensing device in the form of a fluid dispenser which can be discharged by a relatively small amount of electric power. In addition, through the use of less complex parts and fewer parts, a less costly device can be manufactured while improving its reliability.

SUMMARY OF THE INVENTION

The principal object of the present invention is to provide an anti-burglar device of the fluid dispensing type which can be reliably actuated by a very small amount of electric power, yet is mechanically secured against accidental release, through the use of an electrothermal actuator strip. The electrothermal actuator strip is comprised of a bimetal strip and a heating element in which the bimetal strip is made of materials having dissimilar coefficients of expansion. The bimetal strip is arranged to bend and permit fluid discharge when heated.

A further object of the invention is to provide an anti-burglar device of the chemical weapon type which is readily triggered by a small amount of electric power when an intruder triggers a switch with which the device is connected.

Another object of the invention is to provide an improved means of dispensing fluid into a protected area in a minimum amount of time in order to force an intruder from the protected area and to prevent the intruder from re-entering the area for a reasonable amount of time.

Another object of the present invention is to provide a directable discharge of the fluid, such as by means of a rotatably adjustable dispensing head, so that the device can be located on a door, wall, or the like, and yet, when the device is actuated, the fluid is directed into the area to be protected.

According to the principal aspect of the present invention there is provided an improved means for causing the discharge of fluid from a pressurized container. Such means includes an electrothermal actuator strip adapted to force the dispensing element actuator and the fluid-dispensing element into engagement with each other, thereby causing actuation of the fluid-dispensing element which then discharges fluid. The electrothermal actuator strip is electrically connected to a switch which may be associated with a door, window, or any object which might be moved by an intruder. When the electrothermal actuator strip is in its quiescent position, the fluid-dispensing element will not be acutated by the dispensing element actuator. When the intruder trips a switch with which the device is associated, electric power is applied to the electrothermal actuator strip which causes the electrothermal actuator strip to heat. The heat causes the electrothermal actuator strip to bend and move the dispensing element actuator and the fluid-dispensing element into engagement with each other, thereby causing the fluid-dispensing element to discharge fluid into the area to be protected.

The anti-burglar device of the present invention may be utilized in homes, factories, farms or office buildings and may also be used in connection with vehicles such as boats, trucks, airplanes, etc. The device may also be employed for any other application wherein it is desired to prevent unauthorized persons from moving certain objects by placing the mounted device against the object.

Once actuated, the device will dispense fluid into the protected area making it impossible for the intruder to remain in the protected area without having protective equipment.

Although the fluid dispensing device is shown as an anti-burglar device; it is recognized that the device can be used for periodically emitting a spray of atomized fluid into the atmosphere. By the addition of a timing circuit to periodically actuate a metering valve, the fluid dispensing device may be used for the spray applications of insecticides, disinfectants, deodorants, room air fresheners and the like.

Other objects, aspects and advantages of the invention will become apparent from the following description taken in connection with the accompanying drawings.

DESCRIPTION OF THE PREFERRED EMBODIMENTS

Figure 1:
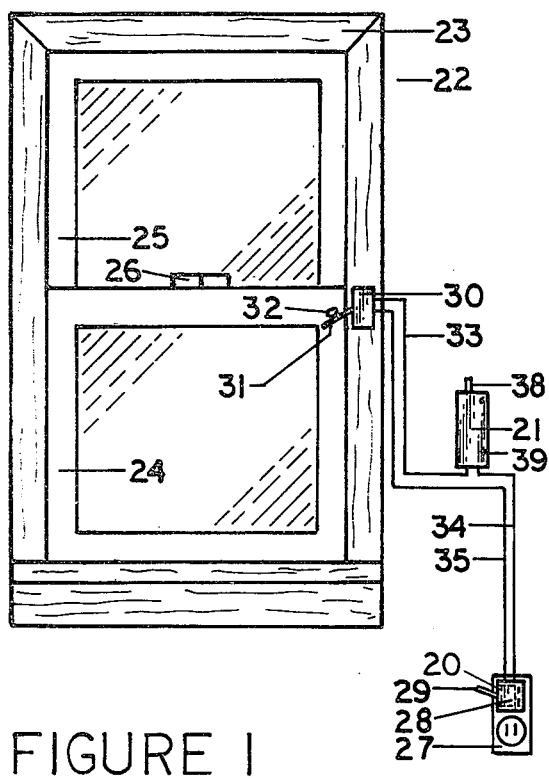
FIG. 1 is an elevational view of a wall of a room having one embodiment of the fluid dispensing anti-burglar device secured to the wall and electrically connected to a switch mounted on the frame of a window whereby the contacts of the switch are held open by the window.

Referring now to the drawings in detail, wherein like reference characters designate like parts throughout the various views, there is shown in FIGS. 1-4, one form of the fluid dispensing anti-burglar device, called the device hereafter, of the chemical weapon type according to the present invention, generally designated 21. The device 21 may be installed anywhere in an area to be protected and may be connected in series to a switch and an electric power supply. One such installation is shown in FIG. 1, wherein the device 21 is fastened to a wall 22 and connected in series by means of wires 33, 34 and 35 to a switch 30 and to an electric power supply 28. The electric power supply 28 may be of any compatible voltage and is shown for convenience as being adapted for use with the standard 110 volt alternating current wall outlet 27, available almost everywhere in the United States. The power supply may contain a switch 20 having an actuator arm 29 for turning the electric power "on" or "off".

The switch 30 is shown for convenience as being mounted on the window frame 23 so that its actuator arm 31 is controlled by pin 32 fastened to the window 24. The switch 30 is of the normally closed type wherein its contacts will close when its actuator arm 31 is released. Therefore, the pin 32 will hold the contacts of switch 30 open and no electric power can be applied to device 21.

Figure 2:
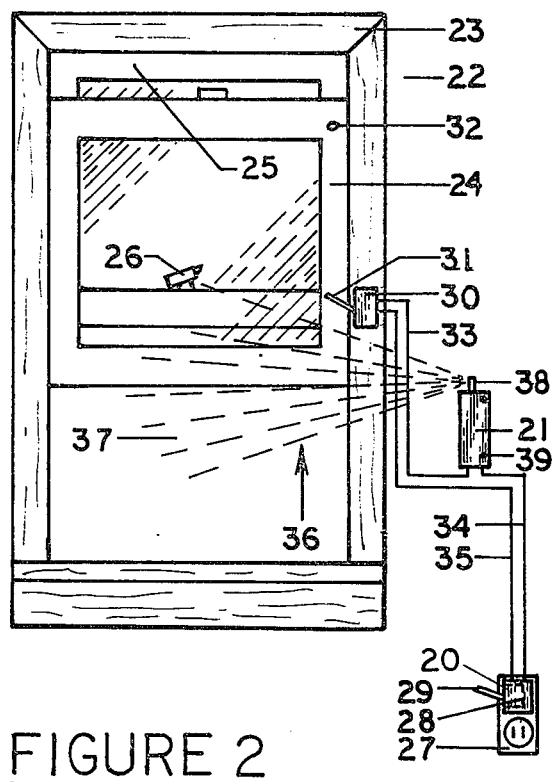
FIG. 2 is an elevational view similar to FIG. 1, but showing the window open and the device dispensing fluid.

With the actuator arm 29 of the electric power supply switch 20 in the "off" position, the window 24 may be safely opened and closed without causing the device 21 to discharge. When the actuator arm 29 is in the "on" position, opening of the window 24 will close the contacts of switch 30 and electric current will flow to the device 21. As shown in FIG. 2, the device 21 will dispense fluid 37 when electric power is supplied to it by the closing of the contacts in switch 30 upon the opening of the window 24. Although the electric power supply is shown as being supplied by an external power source and the switch 30 is mounted external of device 21; it is recognized that the switch 30 and/or electric power supply 28 in the form of electric batteries may be installed inside device 21.

Figure 3:
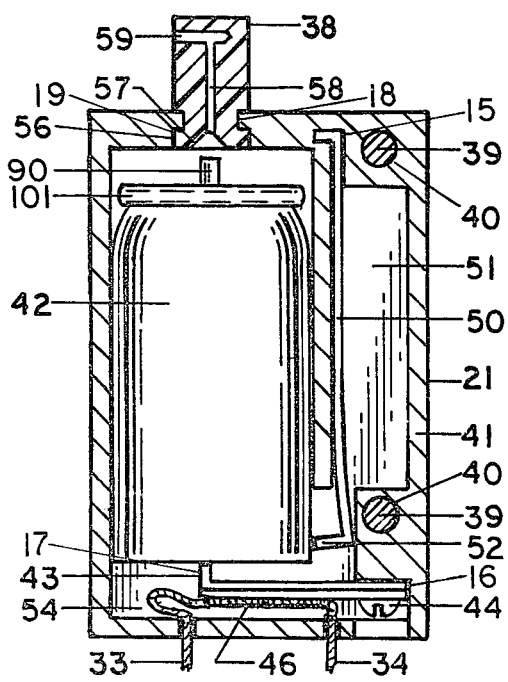
FIG. 3 is a front elevational view of the fluid dispensing anti-burglar device showing the internal construction of the device.

The device 21 is shown in FIG. 3 as comprising a pressurized container 42, called container 42 hereafter, mounted in a body member 41. The body member 41 is shown for convenience as being constructed in two halves. FIG. 3 shows this type of construction wherein the cover or front half is removed to show the interior construction. The two body halves when assembled provide four flat sides for mounting the device 21 to the wall 22 or elsewhere. The holes 40 may be used for attaching device 21 to a wall 22 or elsewhere by screws 39.

Figure 4:
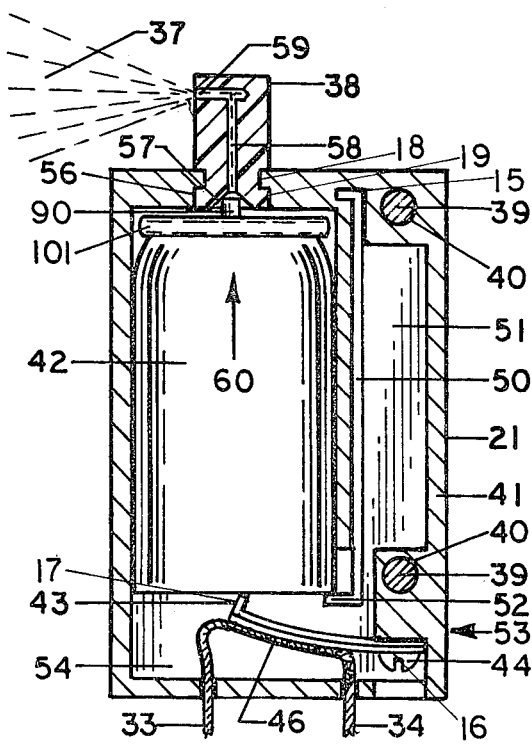
FIG. 4 is a front elevational view similar to FIG. 3 but showing the electromechanical actuator strip energized and the device dispensing fluid.

The coaxial cylindrical bores 18, 19 and 54, as shown in FIGS. 3 and 4, are formed when the symmetrically opposite body halves are joined together. The cylindrical bore generally designated 54 slidably mounts the container 42 of which one type is sold by Defense Products Manufacturing Corporation, 1628 South Hanley Road, St. Louis, Mo. identified as their "Paralyzer" and another type is sold by Penguin Industries, Inc., Parkesburg, Pa. identified as their "10-4 Chemical Billy" but the invention is not limited to the use of these containers. The container 42 includes a fluid-dispensing element which comprises a spring urged projecting dispensing spout 90 which when depressed discharges a fluid 37 through the center of the projecting dispensing spout 90.

Figure 9:
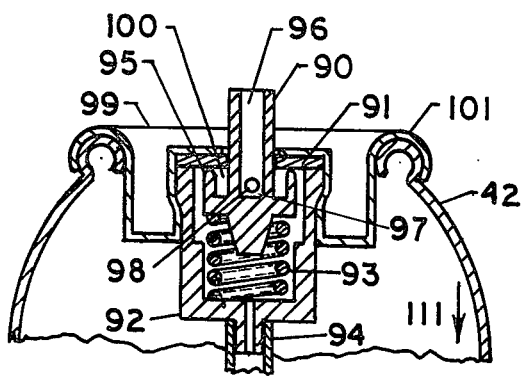
FIG. 9 is a partial vertical section showing a valve for use with the pressurized container having a projecting dispensing spout.

One type of pressurized container 42 shown as having a fluid-dispensing element in the form of a projecting dispensing spout 90, for use in this embodiment is shown in FIG. 9 as containing a valve assembly generally designated 101. Valve assemblies of this type are well known in the trade and one type of which is sold by Scovill, Manchester, N.H. as their S-63 valve assembly. The valve assembly 101 is shown as being comprised of a projecting dispensing spout 90 which has generally a hollow tube portion 96 and is closed at one end 97 thereof. A valve seat 95 is formed around the sealed end 97 of the dispensing spout 90 and contains a recessed portion 100 formed to provide a fluid passageway which will permit fluid flow to a discharge hole 98 and gives fluid access to the hollow tube 96. The dispensing spout 90 is slidably mounted in spring cup 92 and is urged by spring 93 toward the valve seal 91. In this position, the valve seat 95 forms a seal with the valve seal 91. A dip tube 94 may be attached to the spring cup 92 to provide access to fluid when in liquid form in the bottom of the container 42. The assembly is generally mounted in a metal cup 99 which is then fastened to the container 42.

When the projecting dispensing spout 90 is moved in direction 111, the valve seat 95 is separated from the valve seal 91 thereby, permitting fluid under pressure to flow up dip tube 94, around the valve seat 95, through the discharge hole 98 and out the hollow tube 96.

Again referring to FIGS. 3 and 4, the body member 41 forms cylindrical bores 18 and 19 providing means for mounting the dispensing head 38 which may be rotatable as shown. The dispensing head 38 contains a fluid passageway 58 having an entry section 57 at one end thereof for engaging with the projecting dispensing spout 90 of container 42 and a discharge section 59 on the other end. The dispensing head 38 provides a means for the fluid 37 to be discharged into and directed from when the projecting dispensing spout 90 of the container 42 is forced into the entry section 57 by the electrothermal actuator strip 43 acting to move the slidably mounted container 42 in the direction of arrow 60. The funnel shape of the entry section 57 engages the projecting dispensing spout 90, which is made of a relatively soft material and therefore provides an adequate seal at the entry section 57 to retain fluid flow in the passageway 58 at pressures normally used in the container 42.

The container 42, in the position illustrated in FIG. 3, is in its quiescent position where the electrothermal actuator strip 43 is not actuated and the spout 90 is coaxial but displaced from the entry section 57.

Figure 8:
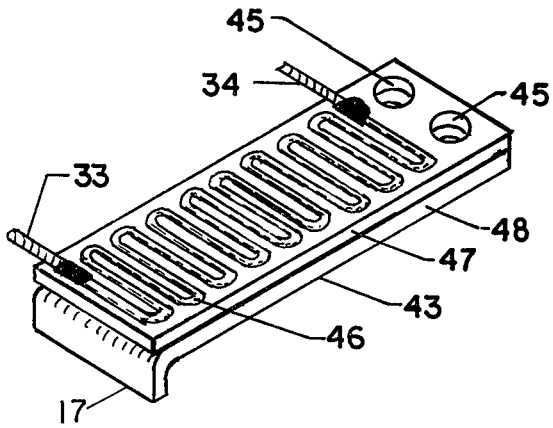
FIG. 8 is an elevational view of the electrothermal actuator strip.

The electrothermal actuator strip, generally designated actuator 43 can be best seen in FIG. 8. The actuator 43 is comprised of a bimetal strip made of two dissimilar metals attached together by welding, bonding or similar process. By using a material which has a high coefficient of expansion such as brass ($\alpha = 19 \times 10^{-6}$/degree C) for the strip 47 farther from the container 42 and a material which has a low coefficient of expansion such as steel ($\alpha = 12 \times 10^{-6}$/degree C) for the other strip 48; the resulting bimetal strip will bend to move container 42 upon the application of heat (increase in temperature). A means for converting the applied electric power into heat can be provided by a resistance heater 46 which can be in the form of an electric coil or a resistance grid mounted, bonded or attached to the electrothermal actuator strip 43.

Now referring to FIGS. 3 and 4, the electrothermal actuator strip 43 will engage with and move with the container 42 when actuated. For simplicity, a shaped portion 17 for engaging the container 42 is illustrated as being a bent section of the bimetal strip 43. It should be understood that the shaped portion 17 should be of sufficient rigidity to resist deforming when actuated in order to move the container 42.

The bimetal strip 43 is mounted in a slot 16 formed in body member 41 as can best be seen in FIGS. 3 and 4. One end of the actuator 43 is mounted in the body member 41 shown for convenience with screws 44. The other end of actuator 43 is free to move between a quiescent position wherein the projecting dispensing spout 90 is separated from the funnel shaped entry section 57 and an actuation position wherein the actuator 43 forces the projecting dispensing spout 90 into engagement with the funnel shaped entry section 57. The projecting dispensing spout 90 is depressed by this action and fluid is released from the container 42.

Again referring to FIGS. 3 and 4, as electric power is applied to the electrothermal actuator strip 43, the resistance heater 46 heats the electrothermal actuator strip 43, whereby the resulting difference in coefficients of expansion between the different materials will cause the electrothermal actuator strip 43 to bend in the direction of arrow 60, moving from the quiescent position to the actuation position. Continued bending of the electrothermal actuator strip 43 will force the shaped portion 17 to move the container 42, thereby permitting the container 42 to move in direction 60. The electrothermal actuator strip 43 will then move the container 42 toward the funnel shaped entry section 57. The fluid-dispensing element in the form of a projecting dispensing spout 90 engages with the dispensing element actuating means in the form of a funnel shaped entry section 57 of the passageway 58 and thereby causes fluid discharge as the projecting spout 90 is depressed.

Yet another important feature is that the dispensing head 38 is rotatable in bores 18 and 19 through a large angle up to 360° so that the fluid 37 may be directed into any area relative to the triggering object.

It is also important that the electrothermal actuator strip 43 provide a substantial force so that the projecting dispensing spout 90 will seat in the entry section 57 with sufficient force to release the pressurized fluid through the passageway 58 and out the dispensing head 38.

If it is desired to utilize the fluid dispensing antiburglar device again, it is reset as illustrated in FIG. 1. If it is desired to render it temporarily inoperative, the actuator arm 29 on power supply 28 is moved to the "off" position.

Security from accidental release is achieved by keeping the electrothermal actuator strip 43 recessed from the exterior surface of the body member 41. By mounting the electrothermal actuator strip 43 in the body member 21 in this manner, there is no surface of the actuator 43 exposed to grip and therefore cannot be released.

It is also important in this embodiment that the fluid-dispensing element comprises a dispensing valve 101 having a projecting dispensing spout 90 which when depressed causes fluid discharge therethrough. The fluid passageway 58 contains the fluid dispensing actuating means in the form of a funnel shaped entry section 57 which engages the projecting dispensing spout 90 and forms a seal between the entry section 57 of passageway 58 and the projecting dispensing spout 90.

Although the device 21 is shown as having the fluid passageway 58 contained in a rotatable dispensing head 38, the passageway may also be formed in the body member 41.

A means for locking the pressurized container 42 in the discharge position after actuation may be provided, although the electrothermal actuator strip 43 will cause the device 21 to discharge until the electric power is turned off or until the container 42 is exhausted. The means for locking the pressurized container 42 in its discharge position is shown as a spring biased latch 50. The spring biased latch 50 is inserted in the slot 15 in the body member 21. When the actuator 43 is energized and the container 42 is moved to discharge fluid, the spring biased latch 50 moves to hold the container 42 in the discharge position.

Figure 5:
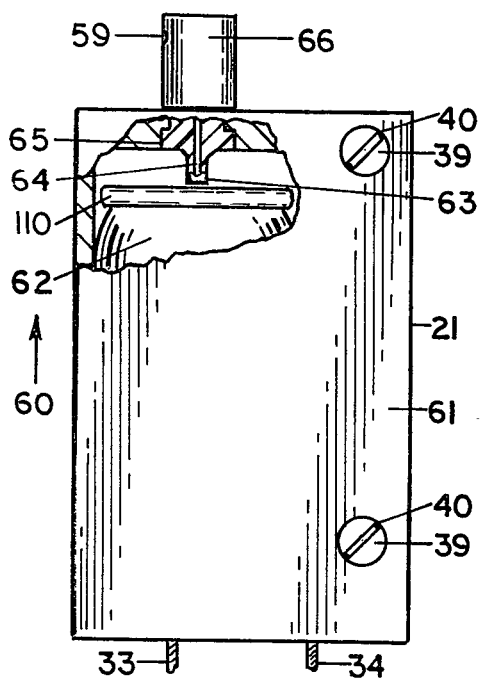
FIG. 5 is a front elevational view similar to FIG. 3 but showing a second embodiment of the anti-burglar device containing a pressurized container having a recessed valve.

A second embodiment of the invention is illustrated in FIG. 5. In this embodiment the basic structure is as previously described and like members are used to indicate like or corresponding parts.

In this embodiment, the pressurized fluid container 42, shown in FIGS. 3 and 4 as having a projecting dispensing spout 90, is replaced with a pressurized fluid container 62, shown in FIG. 5, having a recessed valve. Pressurized containers with a recessed dispensing valve are well known in the trade. In addition, the funnel shape of the entry section 57 of the fluid passageway 58 of the first embodiment shown in FIGS. 3 and 4 is replaced with projecting spout 63 depending from dispensing head 66 all of which are shown in FIG. 5.

In this embodiment, all elements function as described in the first embodiment with the following difference. The pressurized container 62 is discharged by the action of the electromechanical actuator strip 43 moving the pressurized container 62 such that the recessed valve of the pressurized container 62 is depressed through engagement with projecting spout 63 and thereby effects discharge.

Figure 10:
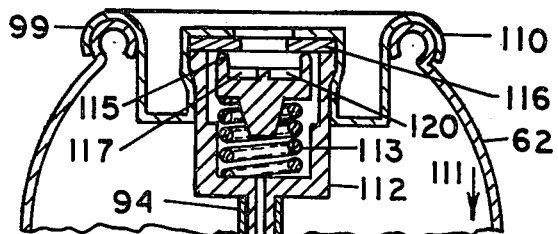
FIG. 10 is a partial vertical section showing a valve for use with a pressurized container having a recessed valve.

One type of recessed valve for use in this embodiment is shown in FIG. 10 and is generally designated 110. Valve assemblies of this type are well known in the trade and one type of which is sold by Scovill, Manchester, N.H. The valve assembly 110 is shown as being comprised of a valve seat 115 mounted in a spring cup 112. The valve seat 115 contains a recessed portion 120 and recessed channels 117 formed in valve seat 115.

The valve seat 115 is slidably mounted in spring cup 112 and is urged by spring 113 toward valve seal 116. In this position, the valve seat 115 forms a seal with the valve seal 116. The valve assembly 110 is generally mounted in a metal cup 99 which is then fastened to the pressurized container 62.

When the device is actuated, the valve assembly 110 is moved along with the pressurized container 62 in the direction 60. As movement continues, the projection spout 63 of the dispensing head 66 engages with and moves the valve seat 115 from engagement with valve seal 116 permitting fluid under pressure to flow around the valve seat 115, through the discharge channels 117 and out passageway 64. When the projecting spout 63 enters the valve assembly 110, the valve seal 116, being made of resilient material, forms a seal between the circumference of the projecting spout 63 and the valve seal 116, thus preventing fluid leakage.

The fluid 37 is then discharged through the valve 110 of the pressurized container 62, through the passageway 64 and out the dispensing head 66, then into the area to be protected.

It is important in this embodiment that the fluid-dispensing element comprises a recessed valve assembly 110 which when depressed causes fluid discharge. It is also important that the entry section of passageway 64 contain a fluid dispensing element actuating means in the form of a projecting spout 63 which engages with the recessed valve assembly 110 and causes fluid discharge.

Figure 6:
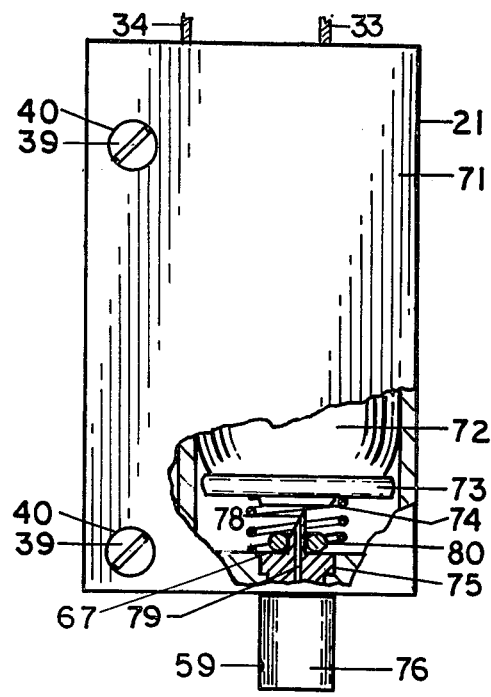
FIG. 6 is a front elevational view similar to FIG. 3 but showing a third embodiment of the anti-burglar device containing a pressurized container having a pierceable seal and a means for piercing the seal.

A third embodiment of the invention is illustrated in FIG. 6. In this embodiment the basic structure is as previously described in the first embodiment and like numbers are used to indicate like or corresponding parts.

In this embodiment, the pressurized fluid container 42, shown in FIGS. 3 and 4 of the first embodiment and having a projecting dispensing spout 90, is replaced with a pressurized fluid container 72 shown in FIG. 6, having a pierceable seal 74. Pressurized containers having pierceable seals are well known in the trade. In addition, the funnel shaped entry section 57 of the first embodiment shown in FIGS. 3 and 4 is replaced with a projecting section 78 shaped to pierce seal 74 and a means of making a seal capable of withstanding the pressure required for effectively discharging fluid through the passageway 79 and into the restricted area.

Now referring to FIG. 6, FIG. 6 is an inverted embodiment of FIGS. 3 and 4 of the first embodiment in which all elements function as described in the first embodiment with the following exceptions. The pressurized cylinder 72, when actuated by the electrothermal actuator strip 43, is forced into pierceable engagement with the piercing projecting section 78. As tjhe pierceable seal 74 is pierced by the action of the projection forward section 78, the electrothermal actuator strip 43 continues to move the container 72 forming a seal by the action of the O-ring 80 and its retaining seat 67 and the pierceable seal 74 of the pressurized container 72. The fluid 37 is then discharged through the pierced seal 74 of the pressurized container 72, through passageway 79, out the orifice 59, and then into the area to be protected.

It is important in this embodiment that the fluid-dispensing element comprises a pierceable seal 74 which when pierced will permit fluid discharge therethrough. It is also important that the dispensing element actuating means comprise a projecting piercing section 78 set in a position to pierce the pierceable seal 74 when the pressurized container 72 is moved toward it. It is also important that a seal be made around the projecting piercing section 78 to prevent fluid leakage within the body member 71 after the pierceable seal 74 is pierced.

Figure 7:
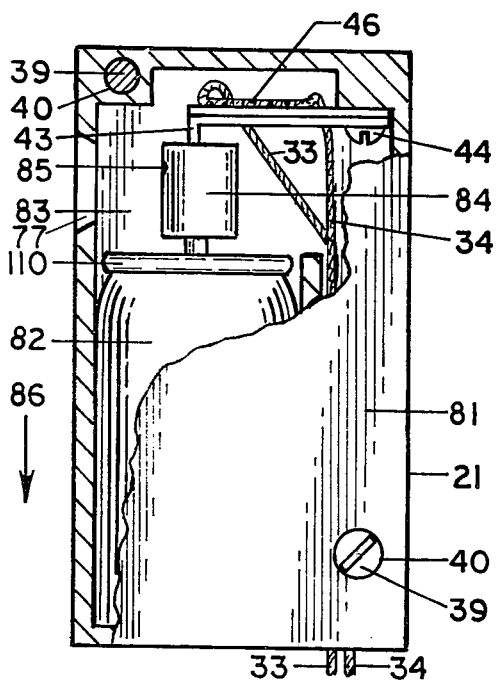
FIG. 7 is a front elevational view similar to FIG. 3 but showing a fourth embodiment of the anti-burglar device containing a pressurized container having a projecting dispensing cap.

A fourth embodiment of the invention is illustrated in FIG. 7. In this embodiment, the basic structure is as previously described in the first embodiment and like numbers are used to indicate like or corresponding parts.

In this embodiment, the projecting dispensing spout 90 of pressurized fluid container 42, shown in FIGS. 3 and 4, is replaced with a projecting dispensing cap 84 shown in FIG. 7. In addition, the fluid passageway 58 and the entry section 57 are replaced with an aperture 77.

Now referring to FIG. 7, the electrothermal actuator strip 43 operates as before except that the electrothermal actuator strip 43 causes the projecting cap 84 to be depressed, thereby causing discharge through aperture 77.

It is important in this embodiment that the fluid-dispensing element comprise a projecting dispensing cap 84 which when depressed causes fluid discharge therethrough. The body member 21 contains an aperture 77 in communication with the projecting dispensing cap 84 to provide for fluid discharge from the body member 21. A dispensing element actuating means is provided by the electrothermal actuator strip 43 which will depress the dispensing cap 84 and thereby cause fluid discharge.

Figure 11:
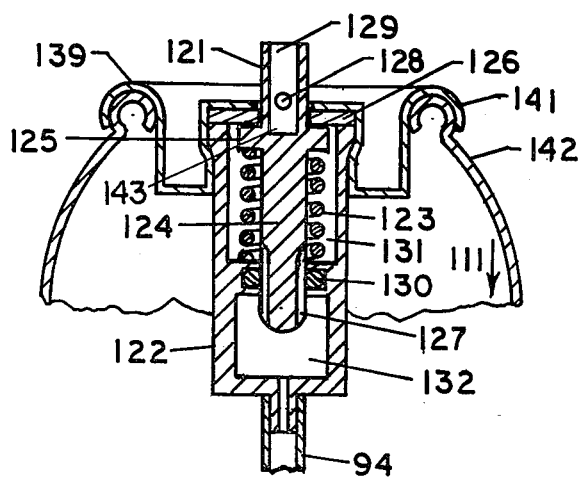
FIG. 11 is a partial vertical section showing a metering valve for use with a pressurized container.

A fifth embodiment of the invention is shown as a combination first embodiment with a metering valve shown in FIG. 11. In this embodiment, the basic structure is as previously described in the first embodiment and like numbers are used to indicate like or corresponding parts.

In the previous embodiments, the electrothermal actuator strip 43 will discharge fluid from the pressurized container until all the fluid is discharged or the pressure drops too low to discharge the fluid. Through the use of a metering valve, such as the one shown in FIG. 11, and by removing the latch 52 which was shown in FIGS. 3 and 4; the devices of the first, second and fourth embodiments can be made to dispense fluid each time switch 30, shown in FIGS. 1 and 2, is actuated. After the device 21 was actuated and when the switch 30 is open, the heater 46 of the electrothermal actuator strip 43 is deenergized and the electrothermal actuator strip 43 cools. As the electrothermal actuator 43 cools, it returns to its original quiescent position and the fluid-dispensing element also returns to its original position; ready for the next closing of switch 30.

The metering valve 141, one type of which is shown in FIG. 11 will discharge a predetermined amount of fluid each time the dispensing spout 121 is moved in the direction 111. The metering valve 141, as shown in FIG. 11, comprises a dispensing spout 121 which has a hollow tube portion 129 and is closed at one end 143 thereof. A valve seat 126 is formed around the sealed end 143 of the dispensing spout 121 and forms a seal between the dispensing spout 121 and the valve cup 139. The dispensing spout 121 has an annular ring 125 formed around it which serves as a stop to limit the travel of the dispensing spout 121 in a direction opposite that of arrow 111 and to form an additional seal around the dispensing spout 121. The spring 123 serves to move the dispensing spout 121 in the direction opposite the arrow 111. The dispensing spout 121 has recessed grooves 127 formed in the end opposite the hollow tube portion 129. The recessed grooves 127 provide fluid under pressure to the metering chamber 131. An O-ring 130 is provided for making a seal between the spring cup 122 and the dispensing spout diameter 124 when the dispensing spout 121 is moved to its bottommost position.

The metering valve 141 shown in FIG. 11 is ready for an actuation. Fluid under pressure has access to metering chamber 131 through recessed grooves 127. The discharge hole 128 is above the valve seal 126 and no fluid can be discharged. As the dispensing spout 121 moves in the direction 111, a seal if formed by the O-ring 130 and the dispensing spout diameter 124, preventing fluid flow from the pressurized container 142 but trapping fluid under pressure in the metering chamber 131. As the dispensing spout 121 continues to move in the direction 111 the hole 128 passes through the valve seal 126 permitting the fluid under pressure trapped in the metering chamber 131 to pass through hole 128 and out tube 129.

When the valve 141 returns to its original position, the hole 128 passes through the valve seal 126 preventing any fluid flow, continued movement now permits fluid under pressure to pass through the recessed grooves 127 into the metering chamber 131. The valve is now ready for the next actuation.

Figure 12:
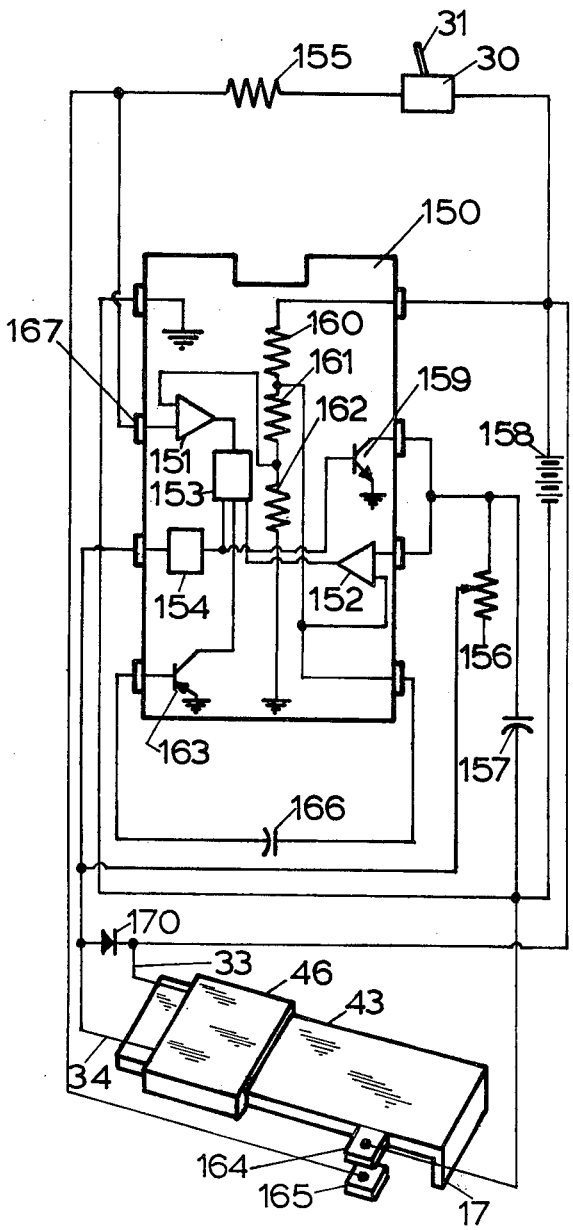
FIG. 12 is a diagram of a circuit for use with a metering valve wherein a metered amount of fluid is dispensed upon each actuation.

The device 21 may also be used to discharge a metered amount of fluid on a periodic timed cycle through the use of a timing circuit. One type of a timing circuit which may be used is shown in FIG. 12. The circuit for causing the timed periodic discharge of fluid is shown for convenience as comprising of the type 555 monolithic timing circuit, generally designated 150. Originally developed by "Signetics Corporation, 811 East Arques Ave., Sunnyvale, Calif., 94086, the 555 and similar integrated timing circuits are now produced by several other semiconductor manufacturers such as Texas Instruments Semiconductor Group, P.O. Box 5012, Dallas, Tex. 75222; and R.C.A. Solid State Division, Route 202, Sommerville, N.J. 08876, and are available at most electronic supply houses.

The 555 timer, generally designated 150, contains two comparators 151 and 152, a flip-flop 153, and a power output stage 154. With external resistor 155, a variable external resistor 156 and an external capacitor 157, the timer 150 can be used for precise timing of the fluid discharge. The circuit is shown for simplicity as being powered by a battery 158.

The operation of the timing circuit may be understood by referring to the block diagram shown within timer 150. Normally, the flip-flop 153 biases transistor 159 on, which in turn, shorts capacitor 157 to ground and prevents it from being charged. The resistors 160, 161 and 162 form a voltage divider which biases comparator 152 at two-thirds the power voltage and comparator 151 at one-third the power supply voltage.

When an activating signal is applied to the timer 150 at the trigger input 167, the comparator 151 sets the flip-flop 154. This turns transistor 159 off and permits capacitor 157 to charge. When capacitor 157 charges to two-thirds of the power supply voltage, comparator 151 resets the flip-flop 154 to its initial standby condition. This turns transistor 159 on again which discharges capacitor 157 to ground.

The complete timing cycle can best be understood by referring to the complete circuit. When switch 30 is closed, the heater 46 of the electrothermal actuator strip 43 is energized. As the bimetal strip of actuator 43 bends to the position which would cause fluid-discharge through actuation of the fluid dispensing element, an electric contact will be made between the contact 164 mounted on the electrothermal actuator strip 43 and the contact 165 which would be suitably mounted in device 21. The closure of contacts 164 and 165 provides a means for controlling the timed cycle wherein the contact closure initiates the timing cycle and thereby turns off the electric power to the electrothermal actuator strip heater 46. The capacitor 157 and the resistor 156 provide the circuit's time constants. Capacitor 166 and resistor 155 are used to help prevent false triggering.

Since the timer 150 can be selected to supply enough current at its output, the timer 150 can be used to drive the heater 46 of the electrothermal actuator strip 43 directly since the electrothermal actuator strip 43 can be designed to use little electric power. The diode 170 is used to protect the timer 150 from possible damage by current surges.

When the timer 150 times out, electric power is supplied to the electrothermal actuator strip heater 46 until the electrothermal actuator strip 43 bends to cause the actuation of the fluid dispensing element and cause the closure of contacts 164 and 165. Closure of contacts 164 and 165 cuts the electric power to the electrothermal actuator strip heater 46 and resets the timer 150. The timer 150 starts another timed cycle while the electrothermal actuator strip 43 returns to its original position wherein the metered valve 141 is permitted to reset.

The timing cycle of the circuit, shown in FIG. 12 can be varied from a few microseconds to over 7 minutes by varying the values of resistor 156 and capacitor 157. The switch 30, shown in FIGS. 1 and 2 for operation as an anti-burgular device, can be mounted within device 21 as can all the parts related to the circuit shown in FIG. 12. The device containing the metered valve shown in FIG. 11 and the circuit shown in FIG. 12 could be used to dispense fluids on a timed cycle.

The fluid dispensing device described herein in several embodiments was generally shown with a pressurized container 42 with a projecting dispensing spout 90 mounted to discharge into a funnel shaped entry section 57 of a fluid passageway 58 when the device is discharged. Alternately, the device will also function with a pressurized container with a recessed valve by providing a tubular member depending from the body member to cause discharge. In addition, the devices can be used with a sealed pressurized container with a pierceable seal. Also, the pressurized container with a dispensing projecting cap wherein the projecting cap is depressed to cause discharge, but the invention is not limited to these types of containers. The addition of the metering valve and the timing circuit provides the fluid dispensing device with the ability to periodically dispense a metered amount of fluid for spray applications of insecticides, disinfectants, deodorants, room air fresheners and the like.

Although I have herein shown and described the invention in what I have conceived to be the most practical and preferred embodiments, it is recognized that departure may be made therefrom within the scope of my invention, which is not to be limited to the details disclosed herein, but is to be accorded the full scope of the claims so as to embrace any and all equivalent structures and devices.

I claim:

1. A fluid dispensing device for use with a pressurized container, the device comprising;
   a. a body member;
   b. means for supporting said pressurized container in said body member, wherein said pressurized container has a fluid-dispensing element adapted to release fluid under pressure from said pressurized container when actuated;
   c. dispensing element actuating means in said body member adapted to engage and actuate said fluid-dispensing element of said pressurized container;
   d. a passageway in said dispensing element actuating means having an entry section at one end thereof;
   e. an electrothermal actuator strip mounted in said body member moving between a quiescent position and an actuation position, in said quiescent position said fluid-dispensing element of said pressurized container and said dispensing element actuating means are separated from each other, said electrothermal actuator strip moving to said actuation position upon the application of an electric current whereby said electrothermal actuator strip forces said fluid-dispensing element and said dispensing element actuating means into engagement with each other, thereby causing said fluid-dispensing element of said pressurized container to be actuated, whereby fluid is released from said pressurized container to pass through said entry section and passageway.

2. The fluid dispensing device of claim 1 in which said fluid-dispensing element of the pressurized container comprises a pierceable section, means to provide a seal between said pierceable section and said dispensing element actuation means, and means on said dispensing actuating means for puncturing said pierceable section, whereby fluid may be discharged.

3. The fluid dispensing device of claim 2 in which said means for puncturing comprises a projecting section depending from said dispensing element actuation means.

4. The fluid dispensing device of claim 1 wherein said fluid-dispensing element of said pressurized container includes a dispensing valve actuated to permit fluid discharge therethrough upon depression thereof, said valve being actuated through movement of said electrothermal actuator strip to said actuation position whereby the valve is depressed and fluid is discharged.

5. The fluid dispensing device of claim 4 wherein said valved pressurized container includes a projecting dispensing spout, said dispensing spout discharging fluid upon depression thereof, said entry section of said passageway being funnel-shaped for receiving said projecting dispensing spout on said container.

6. The fluid dispensing device of claim 4 wherein said valved pressurized container includes a recessed valve, said dispensing element actuation means includes a projection around said entry section of said passageway extending beyond said entry section toward said container to engage said recessed valve, said recessed valve actuated upon depression thereof to emit fluid.

7. The fluid dispensing device of claim 4 wherein a projecting dispensing cap mounted on the fluid-dispensing element is actuated to permit fluid discharge therethrough upon depression thereof, an aperture in said body member in communication with said cap, said electrothermal actuator strip actuating said cap upon movement of said electrothermal actuator strip to said actuation position thereby discharging fluid from said pressurized container through said cap and aperture.

8. The fluid dispensing device of claim 7 wherein said fluid-dispensing element of said pressurized container includes a metering dispensing valve actuated to dispense a metered volume of fluid.

9. The fluid dispensing device of claim 4 wherein said dispensing valve includes means for dispensing a metered volume of fluid each time said metering valve is actuated.

10. The fluid dispensing device of claim 1 wherein said electrothermal actuator strip moves said dispensing element actuating means and said fluid-dispensing element together when said electrothermal actuator strip moves to said actuation position.

11. The fluid dispensing device of claim 1 wherein said pressurized container is slidably supported in said body member, said electrothermal actuator strip in said actuation position moving said pressurized container to force said fluid-dispensing element into engagement with said dispensing element actuating means thereby causing fluid discharge.

12. The fluid dispensing device of claim 1 wherein said electrothermal actuator strip comprises a heating means and a bimetal strp, said heating means heating said bimetal strip whereby said bimetal strip moves to cause actuation of said fluud-dispensing element thereby causing discharge or fluid from said pressurized container.

13. The fluid dispensing device of claim 1 wherein said electrothermal actuator strip comprises a heating element attached to a bimetal strip, said heating element heating said bimetal strip upon the application of an electric current whereby said bimetal strip moves to cause actuation of said fluid-dispensing element thereby causing fluid discharge.

14. The fluid dispensing device of claim 1 wherein said electrothermal actuator strip comprises an electric resistance heating element and a bimetal strip, said resistance heating element heating said bimetal strip upon the application of an electric current whereby said bimetal strip causes actuation of said fluid-dispensing element thereby causing fluid discharge from said pressurized container.

15. The fluid dispensing device of claim 1 whereby there is a means for locking said fluid-dispensing element and said dispensing element actuating means into engagement with each other after said electrothermal actuator strip moves to said actuation position.

16. The fluid dispensing device of claim 8 wherein there is included a timing means for the periodic actuation of said electrothermal actuator strip.

17. The fluid dispensing device of claim 8 wherein there is included a timing means for the periodic actuation of said electrothermal actuator strip, said timing means including a means for changing the timed period.

18. The fluid dispensing device of claim 17 wherein said electrothermal actuator includes means for resetting the time period.

19. The fluid dispensing device of claim 1 wherein there is included a timing means for the periodic actuation of said electrothermal actuator strip.

20. The fluid dispensing device of claim 1 wherein there is included a timing means for periodic actuation of said electrothermal actuator strip, said timing means including a means for changing the time period.

21. A fluid dispensing anti-burglar device for use with a pressurized container wherein said pressurized container has a fluid-dispensing element adapted to release fluid under pressure from said pressurized container when actuated, the device comprising;
   a. a body member;
   b. means for supporting said pressurized container in said body member;
   c. dispensing element actuating means in said body adapted to engage and actuate said fluid-dispensing element of said pressurized container;
   d. a passageway in said dispensing element actuating means having an entry section at one end thereof;
   e. an electrothermal actuator strip mounted in said body member moving between a quiescent position and an actuation position, in said quiescent position said fluid-dispensing element of said pressurized container and said dispensing element actuating means are separated from each other, said electrothermal actuator strip moving to said actuation position upon the application of an electric current whereby said electrothermal actuator strip forces said fluid-dispensing element of said pressurized container and said dispensing element actuating means into engagement with each other, thereby causing said fluid-dispensing element of said pressurized container to be actuated, whereby fluid is released from said pressurized container to pass through said entry section and passageway.

22. A fluid dispensing device for use with a pressurized container wherein said pressurized container has a metering dispensing valve adapted to release a preset volume of fluid from said pressurized container when actuated, the device comprising;
   a. a body member
   b. means for supporting said pressurized container in said body member;
   c. dispensing valve actuating means in said body adapted to engage and actuate said metering dispensing valve of said pressurized container;
   d. A passageway in said dispensing valve actuating means;
   e. an electrothermal actuator mounted in said body member moving between a quiescent position and an actuation position, in said quiescent position said metering dispensing valve and said dispensing valve actuating means are separated from each other, said electrothermal actuator moving to said actuation position upon the application of an electric current whereby said electrothermal actuator forces said metering dispensing valve of said pressurized container and said dispensing valve actuating means into engagement with each other, thereby causing said metering dispensing valve of said pressurized container to be actuated whereby a preset volume of fluid is released from said pressurized container;
   f. and a means for periodically energizing the electrothermal actuator.

23. The fluid dispensing device of claim 22 wherein the periodic energizing means includes an electronic timer arranged to periodically supply electric power to said electrothermal actuator.

* * * * *